United States Patent Office 2,793,996
Patented May 28, 1957

2,793,996

OIL BASE DRILLING FLUID

James L. Lummus, Tulsa, Okla., assignor to Pan American Petroleum Corporation, a corporation of Delaware No Drawing. Application December 8, 1955,
Serial No. 551,725

17 Claims. (Cl. 252—8.5)

This invention relates to drilling, working over, fracturing or otherwise servicing wells. More particularly, this invention relates to oil base fluids suitable for use as drilling or fracturing fluids.

Several commercially successful oil base drilling fluids are now available. One of the principal improvements still desirable is the control of properties such as viscosity, gel strength, fluid loss and the like. If these properties could be controlled a wider variety of base oils including most crude oils, could be employed. A further advantage of being able to control the properties would be the extension of use of the fluid to other processes such as hydraulic fracturing of formations penetrated by wells, perforation of casing, workover and cleanout of wells and the like. A drilling fluid universally useable for all these well servicing operations would obviously be very desirable. It will be apparent, however, that the properties must be controllable to an unusual degree if the fluid is to be used in such varied application.

Variations are desirable not only in properties such as viscosity, gel strength and fluid loss, but also in the nature of the oil insoluble materials present. Oil base drilling fluids containing blown asphalt, an oil dispersible but oil insoluble material, have been widely used to complete hundreds of wells with results equal to those using any other known well completion fluid, and superior to the results using most alternates. However, it is known that the oil insoluble blown asphalt particles enter the formation drilled and sometimes rather seriously decrease the permeabilities of oil bearing zones. If the fluid is used in fracturing operations the blown asphalt particles may also enter the exposed faces of the fracture to decrease the permeability of the rock for a substantial distance from the fracture face. In addition, it will be apparent that if a hard, finely divided material such as ground limestone, is employed to help decrease the filtrate rate, the finely divided particles of such a material may enter the formation pores and become wedged in constrictions so as to decrease the permeability of the formation. The presence of hard, finely divided material may be particularly serious in the case of fracturing operations if some of the particles are sufficiently large to bridge in the fracture and form a base over which the finer particles can then complete a seal which may seriously decrease the flow capacity of the fracture. The properties of the drilling fluid should be sufficiently variable to permit elimination of most of such difficulties. Again, the problem is one of having properties sufficiently controllable to permit omission of constituents undesirable for certain purposes and substitution of materials which are more desirable.

The problem of gel strength deserves special mention. Most oil base drilling fluids have little, if any, gel strength. Thus, the problem is usually one not only of controlling the gel strength but of providing any gel strength at all. Some gel strength is obviously desirable to support weighting material and prevent excessive settling of bit cuttings in the well in case circulation is stopped.

After the drilling fluid properties have been adjusted or controlled to the desired values they should, of course, be maintained near these preselected values during use of the fluid in spite of contamination by solids and particularly by water which may be encountered in the well or in surface equipment. Means for maintaining the properties at preselected values during the various operations are therefore very desirable.

With the above problems in mind, an object of this invention is to provide an oil base drilling fluid the properties of which can be controlled within wide limits. An additional object is to provide an oil base drilling fluid of universal applicability to well servicing operations such as drilling in, workover, cleanout, hydraulic fracturing, and casing perforating. A more specific object is to provide a well completion fluid for use in drilling in, hydraulic fracturing, perforating, and the like, which does not have the disadvantage of oil insoluble constituents such as blown asphalt, ground oyster shells and the like. A still more specific object is to provide an oil base drilling fluid having a desirable gel strength. A further object of my invention is to maintain the properties of an oil base drilling fluid at or near preselected values during various operations. Additional objects of my invention will appear to those skilled in the art from the following description of my invention.

My invention consists principally, in its simplest form, of a combination of petroleum oil, a fatty acid residue as described in more detail hereinafter, an aqueous solution of an alkali metal hydroxide, and an oxidizing agent such as sodium dichromate. Lecithin and calcium chloride may also be employed to control the properties further and to stabilize these properties with respect to contamination by solids and/or water. If the combination is to be used as a drilling fluid some finely divided inert solids such as ground oyster shells may be added. If it is to be used as a well completion fluid, oil insoluble solids should be omitted and may be replaced by certain oil soluble solids.

The use of lecithin and calcium chloride is further described and claimed in my co-pending U. S. Patent application, Serial Number 327,163, filed December 20, 1952, now abandoned and will not be described in detail here. The other five ingredients, the oil, the fatty acid residue, the alkali metal hydroxide, the oxidizing agent, and the inert solids should be considered further.

OIL

The oil may be of mineral, vegetable or animal origin. Thus the oil may be most crude petroleums, glyceride esters such as whale oil or cotton seed oil or an aromatic hydrocarbon such as benzene. Preferably, however, the oil should be a normally liquid hydrocarbon such as benzene, turpentine, crude petroleum, or refined fractions of petroleum. Petroleum and its fractions are preferred because of their compatibility with oil well fluids as well as their ready availability and low cost.

In the actual well servicing fluid the oil is the base liquid and will normally make up about 80 to 90 percent by weight of the servicing fluid. In some cases, however, such as highly weighted drilling fluids, the amount of oil may actually be less than 50 percent. If liquid concentrates are prepared, the amount of oil used will be just sufficient to decrease the viscosity to around 1000 centipoises or less so it can be more easily handled.

FATTY ACID RESIDUE

Suitable fatty acid residues may be produced by the propane extraction of fatty materials such as animal and vegetable fats, oils and fatty acids. When the term "residue produced by the propane extraction of fatty materials" is used hereinafter, the residue remaining insoluble when the fatty material is extracted with propane will be intended. The process for obtaining these residues is well described and illustrated in Industrial and Engineering Chemistry, February 1949, page 280. One such acid residue can be obtained under the trademark Ebony fat. This is the residue remaining from propane extraction of fats and oils principally of animal origin. Another specific acid residue is obtainable under the trademark Tallene. This is the residue from propane extraction of tall oil. Other residues are mentioned in the above Industrial and Engineering Chemistry article and still others will occur to those skilled in the art.

An operable fatty acid residue can also be prepared by distilling at about 270° C., under about 4 mm. of mercury pressure, the by product acids obtained in the preparation of sebacic acid by fusing castor oil with alkali. Production of this residue is described in more detail in U. S. Patent 2,267,269 Cheetham et al. A suitable residue of this type designated as VR-1 acids can be obtained from Rohm and Haas Company.

All the fatty acid residues described above are characterized by being polybasic acids having at least about 12 carbon atoms per acid radical and containing more oxygen than that present in the acid radical. It is presumed that such residues are formed from the highly unsaturated constituents of the fatty acids and oils. Such constituents may easily polymerize or react with oxygen before or during processing of the fatty acids and oils to remove the residues. It is possible also that some of the polymers and oxygen containing constituents are of natural occurrence in the fats and oils.

The term "fatty acid residue" is intended herein to include all residues from the treatment of animal or vegetable fats, oils or fatty acids derived from them in which the residues contain highly oxidized polybasic acids having at least about 12 carbon atoms per acid radical. The term "highly oxidized" is intended to indicate that the acid molecule contains more oxygen than that present in the acid radical thereof.

It is presumed that the fatty acid residue imparts desirable viscosity, gel strength and fluid loss properties to oil because it supplies material which becomes colloidally dispersed in oil. Some colloidal particles are naturally present. These are apparently the polymerized highly oxidized acidic constituents. Some of the effective materials are produced by reaction with or in the presence of alkali metal hydroxides and oxidizing agents. Some water must be present in order for the hydroxides and oxidizing agents to be effective. Even a small amount of water makes possible the formation of emulsions. This is particularly true since salts of the fatty acidic constituents are generally good emulsifying agents. The finely dispersed emulsion water droplets undoubtedly also contribute to the properties of the fluid.

The amount of fatty acid residue desirable in a particular well servicing fluid depends in part on the type of service which the fluid is to perform and in part on the amounts and types of other ingredients which are present. The desirabe amounts of all the ingredients depend ultimately on the required properties of the well servicing fluid. If the fluid is to be used for drilling, the viscosity should be between about 30 and about 250 centipoises. The initial gel strength should be between 0 and about 5 grams for drilling fluids having high viscosities. Such drilling fluids should have a 10-minute gel strength in the range of about 2 to about 20 grams. For thinner drilling fluids, that is, those having viscosities of about 100 centipoises ore less, the initial gel strength may be as high as 10 or 15 grams and the 10-minute gel strength may be as high as about 30 or 40 grams. The fluid loss of the drilling fluid should be as near 0 as possible. The viscosity, gel strength and fluid loss properties of all well servicing fluids should be determined by the methods described in API Code No. 29, second edition, July 1942 (tentative). When reference is made to these properties hereinafter, it is intended that they be measured by the API methods unless otherwise specified.

If the well servicing fluid is to be employed in fracturing operations and if vertical fractures are desired, then the properties of the fluid should be similar to those for drilling fluids. The principal exception is that the viscosity may be considerably higher if desired. If, on the other hand, horizontal fractures are desired, then the fluid should be permitted to penetrate the formations to a limited degree, at least during fracture initiating operations. The viscosity and gel strength properties described for drilling fluids are appropriate for such purposes, but the fluid loss properties should preferably be adjusted to fall in the range of about 50 to about 300 or more ml. in 30 minutes. After the horizontal fracture is initiated, it can best be extended by use of a fluid having the recommended properties for forming vertical fractures or for drilling operations.

In order to achieve desired minimum values of viscosity and gel strength and to reduce fluid loss to desired levels, it is normally necessary to employ at least about 2 pounds of fatty acid residue per barrel of drilling or fracturing fluid. The term "barrel" as used herein means a 42-gallon barrel. It will be understood that this minimum amount will vary somewhat, depending upon the type of fatty acid residue used and the amount and type of oil as well as the amount and type of other additives, such as alkali metal hydroxides, oxidizing agents and inert solids which are present. Even if a thick oil base is used together with nearly optimum amounts of other additives the amount of fatty acid residue should not be less than about one pound per barrel if desired drilling or fracturing fluid properties are to be obtained. As much as 20 or 30 pounds of fatty acid residue per barrel of well servicing fluid may be used if high viscosity and very low fluid loss are desired. These are conditions desirable in a fluid used for forming vertical fractures in formations penetrated by wells and for extending horizontal fractures. For most drilling or fracturing fluids, from about 5 to about 10 pounds of fatty acid residue per barrel of well servicing fluid should be employed.

ALKALI METAL BASE

The function of the alkali metal hydroxide is to increase the viscosity and gel strength of the well servicing fluid and to decrease fluid loss. At least part of these effects are probably due to reaction of the alkali metal hydroxide with the acidic groups of the fatty acid residue to form the alkali metal soaps of these polymerized highly oxidized acids. Apparently these soaps are somewhat less soluble in the oil than the original fatty acid residue. Thus, more colloidally dispersed particles are produced to increase the viscosity and gel strength and to decrease the fluid loss. I do not, however, wish to be bound by this theory since part of the effects are also undoubtedly due to emulsification, in the oil base, of the water in the aqueous alkali metal hydroxide solution. The alkali metal hydroxide may, and probably does also catalyze polymerization of any aldehydes resulting from action of the oxidizing agent on the unsaturated linkages of the fatty acid residue constituents. This should produce larger and probably harder colloidal particles which are also less oil soluble. Such larger, harder, and less soluble particles might not cause high viscosity and gel strength but would certainly be effective in reducing fluid loss. Still another possible explanation of the action of the caustic might be that the caustic saponifies any remaining liquid, oil soluble glyceride esters to form solid, colloidal, relatively oil insoluble alkali metal salts of the fatty acids and their polymers. Probably all these reactions are responsible in part for the action of the caustic in the well servicing fluid.

The amount of alkali metal hydroxide may vary within fairly wide limits. Maximum effects are normally obtained by using about 0.5 to 1.0 pounds of the hydroxide for each 10 pounds of fatty acid residue. Thus, in well servicing liquids containing only 1 or 2 pounds of fatty acid residue per barrel, the alkali metal hydroxide content may be as low as 0.05 pound per barrel. In practice it is generally advisable to use a little excess hydroxide to allow for some reaction with acidic constituents such as naphthenic acids in crude oil which may be used. This is, of course, less of a problem if a refined oil such as No. 2 fuel oil or kerosene is used, as an oil base. In any case, at least about 0.1 or 0.2 pound of alkali metal hydroxide should normally be used per barrel of drilling or fracturing fluid and preferably for most purposes between about 0.5 and 2.0 pounds. The principal effects of overtreating are slight decreases in the 0 and 10 minute gel strengths, a slight increase in viscosity, and a little further reduction in fluid loss. Thus, it is usually advisable to overtreat rather than to undertreat with the hydroxide. As much as 10 pounds of caustic soda per barrel of drilling or fracturing fluid has been used without serious objectionable effects.

The alkali metal hydroxide should preferably be sodium hydroxide because of the low cost of this material. Potassium hydroxide is somewhat more effective for certain purposes but in general the increased effectiveness is more than offset by increased cost. Other alkali metal hydroxides can be employed if desired, but usually are not considered economically practical. Alkaline earth metal hydroxides produce some of the same effects as the alkali metal hydroxides but the magnitude of these effects is generally small compared to those produced by the alkali metal hydroxides. Other metal bases such as sodium carbonate, are also effective and may be used. So far as I have been able to determine, all the alkali and alkaline earth metal bases are operable to some extent and should be considered suitable for use in my compositions and methods. However, the alkali metal hydroxides are, in general, so superior to the other bases that they should be used if possible.

OXIDIZING AGENT

Oxidizing agents have only a slight effect on the viscosity of well servicing fluids containing fatty acid residues and alkali metal hydroxides. The effects on gel strength and fluid loss, however, are pronounced. As little as 1.0 pound of an oxidizing agent, such as sodium dichromate, per barrel of well servicing fluid causes a very noticeable reduction in both gel strength and fluid loss properties. The oxidizing agent is particularly valuable for producing low fluid loss at elevated temperatures. For best results a little more than 1.0 pound of oxidizing agent should be used, preferably about 2 to 3 pounds per barrel of oil base fluid. The addition of more than 5 pounds per barrel seems to cause little change in properties. On the one hand this means that there is little point in using more than 5 pounds per barrel and as a general rule, more than 5 or 6 pounds is rarely used. On the other hand, as much as 15 or 20 pounds of oxidizing agent can be used per barrel of drilling or fracturing fluid, if desired.

Several theories may account for the reductions in gel strength and fluid loss which are observed when oxidizing agents are added. One theory has already been mentioned; that is, the oxidizing agents may oxidize the unsaturated linkages of the fatty acid residues to form aldehydes which then polymerize in the presence of the alkali metal hydroxide. Such polymers should be less oil soluble than the unpolymerized residue. Less solvation should occur with consequent reduction in gel strength. The presence of the larger, harder colloidal particles would also account for the observed reduction in fluid loss. Another reaction which is probably responsible for much of the observed reduction in gel strength and fluid loss is an oxygen cross-linkage type of polymerization characteristic of many drying oils. The action is somewhat different, however, from that in drying oils since the usual so-called lead driers and cobalt driers are relatively ineffective compared to the oxidizing agents in producing reductions in gel strength and fluid loss. In addition, the reaction appears to stop after a short time rather than proceeding until a hard solid polymer mass is produced, as in the case of drying oils. Still another reaction is probably an increase in the oxygen content of the fatty acid residue molecules and polymers. This should also decrease the oil solubility of the constituents of the residue with a consequent decrease in their degree of solvation resulting in turn in a lower gel strength of the suspension. All these reactions as well as others, probably occur to some extent and account in part for the observed reductions in gel strength and fluid loss.

Several strong oxidizing agents were tested and all were found to be operable for reducing gel strength and fluid loss. Some, of course, are more effective than others, but apparently all strong oxidizing agents are operable to at least some degree. By the term "strong oxidizing agent" I intend to indicate one with an oxidization potential at least as great as sodium dichromate. Such oxidizing agents, for the purpose of this description, are to be considered equivalent of sodium dichromate. Those oxidizing agents with slightly smaller oxidation potentials such as molecular oxygen, for example, do not seem to be equivalent to the dichromates for my purposes. Sodium dichromate is the preferred oxidizing agent partly because it is among the more highly effective agents and partly because of its low cost.

SOLIDS

Finely divided water insoluble solids such as clay, ground oyster shells, barytes or the like, should be present in many well servicing fluids to increase the density of the composition and to aid in reducing loss of the fluid to formations penetrated by the well. If used in drilling fluids, the solids should usually be insoluble in oil as well as in water so that they will remain undissolved over long periods of time. Often an oil base mud will be stored between jobs and re-used over a period of a year or more. Preferred solids for use in fluids used in drilling are those such as ground oyster shells, barytes and the like, normally used in oil base drilling fluids. Shales and clays are also suitable if only a limited amount of water is anticipated. In general, any solid such as diatomaceous earth, which is insoluble in oil and water and which can be ground until at least about 90 or 95 percent passes a 325 mesh screen, should be considered suitable for my purposes as a drilling fluid constituent to increase density and decrease fluid loss.

All the finely divided solids described above are insoluble in both oil and water. Another class of finely divided solids deserves special mention. These are the oil soluble solids. If such solids are to be used in the drilling fluid itself, the solubility of the solid should be limited in some way. For example, it may be slowly oil soluble. Such slowly oil-soluble solids are useful in well completion fluids such as those used in drilling, in perforating and fracturing, as well as fluids used for workover and cleanout. In all these operations it is frequently important to have solids present to decrease loss of fluids to formations. It is also important, however, that after completion of the operation most of the solids be removed to prevent serious impairment of the permeabilities of producing zones. If slowly oil soluble solids are used in these fluids the advantages of the presence of solids will be retained for a limited time. After completion of the operation, however, the solids will slowly dissolve in the produced oil to eliminate objectionable effects. Thus, for example, the filter cake formed in drilling operations will disintegrate, solids deposited in perforations will be removed, and solids deposited in or over fractures during fracturing methods will be dissolved.

The slowly oil soluble material obviously must not dissolve too rapidly or its effects will be lost before the desired operation is completed. It should, however, dissolve to a very large degree in a reasonable length of time to avoid impairing the permeability of the formation contacted by the emulsion. A convenient test to determine whether a material is a "slowly oil soluble solid" suitable for my purposes is to drop pellets of the solid in No. 2 fuel oil or kerosene at about 80° F. and determine the solution rate. If about one-eighth inch particles are used in the test, they should not dissolve completely in the oil in less than about two days. At least about 60 percent of the solids and preferably at least about 80 percent should dissolve in 60 days to avoid permanent impairment of formation permeability. When the term "slowly oil soluble" is used herein, a material falling within these limits in this test will be intended. It will be apparent that mixtures of slowly oil soluble materials with each other or with small amounts of oil insoluble solids may be used and still fall within this definition of slowly oil soluble solids.

Another type of oil soluble solid suitable for use in my oil base drilling fluid is one which has only a limited solubility in the oil base. Enough of such a solid should be added to saturate the oil, plus the amount desired to be present as undissolved particles. These undissolved particles remain suspended in the oil to give all the benefits of the presence of solids in the drilling fluid. When the well servicing operation is completed, however, and the well is put back on production, the large volume of crude oil flowing past the solid particles in the filter cake, for example, slowly dissolves the solid and removes it from the well.

Still another type of oil soluble solid which can be used in my drilling fluid, when a refined petroleum fraction is used as the oil base, is a solid which is highly soluble in crude petroleum oil but which has a limited solubility in the refined petroleum fraction. The solid will, of course, remain substantially undissolved in the refined petroleum fraction during the well servicing operation. It will dissolve rapidly in the crude oil, however, when the well is again produced.

A convenient source of oil soluble materials having various degrees of solubility is wood rosin and its derivatives. For example, abietic acid can be used as a slowly oil soluble material. Residue acids from wood rosin or tall oil, obtainable under such trademarks as Vinsol or Acintol, have a more limited degree of solubility and a slower rate of solution. In addition, these residues are somewhat more soluble in crude oil than in refined petroleum fractions. Other suitable solids can be selected from the olefin polymers such as the dicyclopentadiene polymers sold under the Panarez trademark or the beta-pinene polymers sold under the Piccolyte trademark. Other suitable solids will be apparent to those skilled in the art and still others can be easily determined by a few simple physical measurements.

When the term "solid of limited solubility" is used hereinafter, a material is intended which will not all dissolve in the base oil for at least about 2 or 3 days, but at least about 60 percent of which will eventually dissolve in a large volume of crude oil. The term "oil soluble solid," on the other hand, is intended to include, in addition to solids of limited oil solubility, those which dissolve rapidly and in large amounts in all oils. Any oil soluble solids can be used to form a dry concentrate so long as it is sufficiently absorbent to dry up the liquid ingredients of the concentrate and so long as it does not react with the other ingredients.

It may be noted that the reaction products of fatty acid residues, alkali metal hydroxides and oxidizing agents are oil dispersible colloids and are not truly oil soluble. Thus, they might be expected to act in much the same manner as blown asphalt, for example. Such has not been found to be entirely true, however. The reaction products of fatty acid residues apparently exist as very small colloidal particles. Thus they easily enter formations but as easily flow out again with little, if any, impairment of permeability.

The term "finely divided," when used in connection with most aqueous drilling fluids, usually means a powder of which 90 to 95 percent will pass a 325 mesh screen. This is the type of powder preferred for oil insoluble solids for my purposes. It will be apparent, however, that coarser particles can be employed if desired, particularly in forming concentrates. In the case of the slowly oil soluble solids, much coarser particles, substantially all retained on 100 mesh screen, for example, should be used to avoid rapid solution in the oil. Some particles as large as about one-eighth inch in maximum dimension may be used if desired and still be considered to be "finely divided" for my purposes.

The term "inert solids" as used herein, is intended to indicate solids which do not react chemically with other constituents of my composition. They may be insoluble in both water and oil, or they may be water insoluble, but soluble in oil.

The amount of water insoluble solids may vary from none at all in fluids used for perforating, fracturing and the like, to 200 pounds or more per barrel in heavily weighted drilling fluids. If such solids are used at all, at least about 20 pounds per barrel are usually added to produce a good fluid loss reduction. Unless a highly weighted drilling fluid is desired, more than about 100 pounds per barrel usually should not be used to avoid thickening the fluid excessively. In addition, it is advisable to keep the solids concentration low, particularly in drilling and workover fluids, since some solids will be dispersed in these fluids during the operations. In some cases where shale is to be drilled, for example, solids may be omitted from the drilling fluid composition, relying on the bit to drill and disperse sufficient shale solids into the drilling fluid to decrease its fluid loss to desired levels.

LECITHIN AND CALCIUM CHLORIDE

Lecithin and calcium chloride, when added to well servicing fluids, are fairly effective in reducing fluid loss and tend to increase the viscosity and gel strength slightly. These materials may be added to a well servicing fluid solely to produce these effects. They are generally added, however, to stabilize the properties of the drilling fluid against the effects of water and solids contamination. That is, the lecithin and calcium chloride generally are not added to well servicing fluids to adjust the properties but to prevent excessive change of these properties when the fluid is contaminated by large amounts of water and finely divided solids which may enter the fluid during drilling operations, for example. As explained in more detail in my copending application S. N. 327,163 the stabilizing action is probably due to the formation of a protective coating of lecithin and calcium chloride over the colloidal particles in the well servicing fluid and over any drilled clay and shale particles. This same protective coating appears to form over colloidal particles of fatty acid residues and their reaction products with alkali metal hydroxides and strong oxidizing agents. As a result, well servicing fluids prepared by use of such materials can also be stabilized against the effects of water and solids contamination by the addition of lecithin and calcium chloride.

One very important precaution should be observed in treating my oil base well servicing fluids with lecithin and calcium chloride. The properties of the fluid should be adjusted to the desired values before the lecithin and calcium chloride are added. This is because the latter materials seem to be as effective in preventing the effects of alkali metal hydroxides and oxidizing agents as they are in preventing the effects of water. That is, the coating of lecithin and calcium chloride on the surfaces of the fatty acid residue particles apparently is fairly effective in preventing reaction of these particles with alkali metal hydroxides and oxidizing agents. To avoid this difficulty the lecithin and calcium chloride generally are not added at all where serious water and solids contamination are not anticipated, as in most well perforating and hydraulic fracturing operations. This permits simpler control of the properties of such fluids. Where the lecithin and calcium chloride are added, only small amounts of the order of 0.5 pound of lecithin and 1 pound of calcium chloride per barrel of fluid are usually employed, although as much as 10 or more times these quantities may be used if serious water contamination is anticipated. If large amounts of water are to be employed to form a water-in-oil emulsion mud, as much as 10 pounds of commercial lecithin and 30 pounds of calcium chloride per barrel of drilling fluid may be added. In any case, these additives should generally be introduced last after the properties of the fluid have been adjusted by the use of the other additives.

WATER

My well servicing fluid has been termed an oil base fluid. As in many such fluids, however, some water should be present since the full effects of the alkali metal hydroxide, strong oxidizing agent and calcium chloride, if used, can be obtained only in the presence of water. As little as 0.5 percent by volume of water (about 1.5 pounds per barrel) is adequate in most cases, although at least 1 percent by volume (about 3 pounds per barrel) is preferred to insure proper reaction of the ionic ingredients. Even more water, up to 5 or 10 percent may be deliberately added to obtain the decreased fluid loss and increased viscosity and gel strength which occurs when this water is emulsified in the oil. This is particularly true for fluids, such as those used for fracturing formations, which are used only once and for a short time. In drilling fluids on the other hand, it is normally advisable to introduce as little water as possible, since the water content always increases during drilling operations, eventually becoming too high for practical use of the drilling fluid. As the water content of drilling fluids increases its effects can be controlled by adding chemicals such as quicklime to react with it, by adding salts such as sodium chloride to saturate the water and thus minimize its effects, or preferably by adding calcium chloride and lecithin before excessive water contamination occurs. By use of these means, or combination of them, acceptable drilling fluid properties can be maintained in the presence of as much as about 40 percent water by volume. By use of the technique later described for decreasing viscosity and gel strength the volume of the water phase may sometimes exceed that of the oil phase.

The composition of my well servicing fluid should fall within the limits indicated in Table I.

*Table I*

| | |
|---|---|
| Fatty acid residue | 1 to 30 lb./bbl. |
| Alkali metal hydroxide | 0.1 to 10 lb./bbl. |
| Strong oxidizing agent | 1 to 20 lb./bbl. |
| Inert solids | 0 to 200 lb./bbl. |
| Commercial lecithin | 0 to 10 lb./bbl. |
| Calcium chloride | 0 to 30 lb./bbl. |
| Water phase | 0.5 to 70 percent by volume. |

LIQUID CONCENTRATE

A concentrate containing at least some of the ingredients of the well servicing fluid will frequently be convient. This concentrate may be either liquid or solid in form. If a liquid concentrate is prepared it should contain the fatty acid residue, either the alkali metal hydroxide, the strong oxidizing agent or both in aqueous solution and sufficient oil to decrease the viscosity to a convenient degree for handling, for example, about 1,000 centipoises. A little lecithin and calcium chloride may be added to the concentrate if desired, but as previously noted, it is preferred to add these constituents to the final drilling fluid after adjustament of properties to desired values.

One precaution should be observed in mixing the liquid concentrate. If too much alkali metal hydroxide and strong oxidizing agent are included the concentrate will gel into a fairly solid mass which will be difficult to disperse in oil. An additional advantage of using small amounts of hydroxide and oxidizing agent is that it permits the widest possible adjustment of quantities of these materials in the final well servicing fluid with a consequent wide selection of properties of the final fluid. A preferred liquid concentrate should include about 100 to 200 pounds of fatty acid residue, about ½ to 2 pounds of alkali metal hydroxide, about 3 to 5 pounds of a strong oxidizing agent and sufficient kerosene or other light petroleum distillate to bring the volume to one 42-gallon barrel.

The ingredients of the concentrate may be mixed in any order but it is preferred to dilute the fatty acid residue with most of the petroleum distillate before adding the alkali metal hydroxide and oxidizing agent. The latter materials may be added as dry powders, water later being introduced to cause reaction with the fatty acid residue. Preferably, however, the hydroxide and oxidizing agent should be added as aqueous solutions. These solutions may be dilute but preferably should be saturated or almost so to avoid the presence of large amounts of water.

SOLID CONCENTRATE

The preferred type of concentrate is a finely divided free-flowing powder. This type is preferred partly because of the ease of handling in paper bags rather than in the drums or other liquid containers required for handling a liquid concentrate. The solid concentrate is also preferred since even though the fatty acid residue, alkali metal hydroxide and oxidizing agent are in intimate contact on the surfaces of solid particles and tend to form a gel as in the liquid concentrate, they are so highly dispersed on the solid particles that no difficulty is encountered in dispersing them in the base oil of the oil base drilling fluid. Obviously, much more of the hydroxide and oxidizing agent can be present in the concentrate if dispersed on the surfaces and in the pores of the solid particles. Nevertheless, it is usually advisable to employ minimum amounts of these two ingredients in the dry as well as the liquid concentrate. This is to permit, again, the widest possible adjustment of quantities in the final well servicing fluid, with consequent wide selection of properties in this fluid. Lecithin and calcum chloride may also be added to the concentrate in small amounts but preferably should be added to the drilling fluid prepared from the concentrate after the properties of the drilling fluid have been adjusted to the desired values.

In general, the dry concentrate should include the fatty acid residue, the alkali metal hydroxide and the oxidizing agent listed in Table I. That is, it should include from about 1 to 30 parts of fatty acid residue, from about $\frac{1}{10}$ to 10 parts of alkali metal hydroxide and from 1 to 20 parts of strong oxidizing agent, all parts being by weight. In addition, the concentrate should contain sufficient dry, finely divided inert solid to form a dry, free-flowing powder. The amount of such inert solids usually is at least about twice the weight of fatty acid residue if the hydroxide and oxidizing agent are added dry. If the latter materials are added in aqueous solution, however, the amount of dry inert solids will usually be at least about 2½ or 3 times the combined weight of the fatty acid residue and the aqueous solutions. If the concentrate is to be used to prepare a drilling fluid, the inert solid should be one such as clay or ground oyster shells insoluble in both oil and water, as previously described as suitable for use in oil base drilling fluids. If the concentrate is to be used to prepare a well completion fluid such as one for use in hydraulic fracturing operations, however, the insert solid may preferably be an oil soluble solid as previously defined. A preferred dry concentrate composition is presented in Table II.

*Table II*

| Ingredient | Amount |
| --- | --- |
| Ebony Fat | 8 lb. |
| Caustic Soda | 1 lb. in about 2 lb. water. |
| Sodium Dichromate Dihydrate | 3 lb. in about 2 lb. water. |
| Clay | 40 lb. |
| Total | 56 lb. including water. |

As noted above, the alkali metal hydroxide and oxidizing agent may be added to the dry concentrate as dry powder. If this is done care must be taken when the concentrate is added to oil to be sure that the oil contains sufficient water to dissolve the hydroxide and oxidizing agent and permit their reaction with the fatty acid residue. Often sufficient water is present in the oil or in the equipment used. In fact, sometimes an oil tank will contain so much water that the concentrate should include some lecithin and calcium chloride to prevent excessive adverse effects of the water. In the usual case, however, the oil will be substantially anhydrous. Therefore, it is generally advisable to add the hydroxide and the oxidizing agent to the concentrate as aqueous solutions so the reaction with the fatty acid residue can take place during mixing or possibly after deposition on the dry solid particles. Then no additional water need be added to the oil when the concentrate is mixed in to form the drilling fluid.

The preferred method of manufacturing a solid concentrate is as follows:

First, the fatty acid residue is preferably warmed to decrease its viscosity. Many of the residues such as Ebony fat should not be heated above about 120° F. to avoid adverse cooking effects. Others such as VR-1 acids may be heated to much higher temperatures. The warm residue is then mixed with about ½ to ¾ of the inert solids to produce a rather sticky powder. Water solutions of the alkali metal hydroxide and the strong oxidizing agent are then added, preferably one at a time, to produce a thick paste or slurry. After mixing to a homogeneous consistency this composition is dried by mixing in the remaining inert solids until a dry powder of a suitably free-flowing nature is produced.

PREPARATION AND USE

When a well completion fluid is to be prepared using a particular base oil, if the same oil has been previously used it will generally be possible to mix in the desired amounts of all ingredients, either individually or as liquid or solid concentrates. Only minor adjustments, if any, will then be required before the addition of lecithin and calcium chloride, if desired to stabilize the properties. If no previous experience is available for a particular oil a little experimenting with a small batch may be advisable. It is possible, however, to add small amounts of ingredients near the minimums in Table I to the entire volume of oil to form a primary fluid. The properties of this fluid can then be adjusted, by the addition of one or more ingredients, to values desired for a final fluid. Lecithin and calcium chloride can then be added, if desired, to stabilize these properties against changes due to contamination by water, bit cuttings and the like. In any case, the preferred order of preparation is to mix the base oil with the fatty acid residue or concentrate. Alkali metal hydroxide is next mixed in, followed by the oxidizing agent. The hydroxide and oxidizing agent should be added as approximately saturated aqueous solutions unless the oil contains at least one or two percent water. If water is present in the oil, then the hydroxide and oxidizing agent can, of course, be added dry. Inert solids are then mixed in. Properties of the fluid are finally adjusted, after which lecithin and calcium chloride may be added to stabilize the properties.

Once a primary fluid is formed, its properties can be adjusted as follows:

1. Viscosity can be decreased:
    *a.* By adding a low-boiling petroleum distillate such as kerosene or No. 2 fuel oil
    *b.* By diluting the fluid with base oil
2. Viscosity can be decreased:
    *a.* By adding more fatty acid residue
    *b.* By adding more caustic
    *c.* By adding water
    *d.* By adding finely divided solids
3. Gel strength can be decreased:
    *a.* By dilution with the base oil, kerosene, No. 2 fuel oil or the like
    *b.* By adding strong oxidizing agent
4. Gel strength can be increased:
    *a.* By adding fatty acid residue
    *b.* By adding caustic if the maximum effect has not been exceeded. If the maximum has been exceeded, as indicated by little change or a slight decrease in gel strength on adding caustic, then fatty acid residue must also be added
    *c.* By adding a little water
5. Fluid loss can be decreased:
    *a.* By adding fatty acid residue
    *b.* By adding alkali metal hydroxide
    *c.* By adding oxidizing agent
    *d.* By adding finely divided inert solids
    *e.* By adding a little water
6. It will rarely, if ever, be desirable to increase fluid loss.

The method of using the well servicing fluid as an oil base drilling fluid is much the same as that for any other oil base drilling fluid. In certain of the other uses I contemplate methods in addition to those normally used. For example, in working over or cleaning out wells in which the formation has been fractured, I contemplate using a lost circulation material such as ground walnut shells in the fluid to bridge the fractures. The usual ingredients of my well servicing fluid then form a seal over these bridges. The seal keeps the fracture clear of solid matter cleaned out of the well during the operation. The gel strength of my well servicing fluid easily holds the lost circulation material in suspension until the fractures are bridged. The gel strength also holds in suspension the sand, clay, scale, paraffin, asphaltic material and the like loosened by the workover or cleanout procedure. The finely divided solids of workover fluids should be at least partly a solid of limited oil solubility so that after completion of the work the bridge and seal will fall apart due to solution of the oil soluble material, or will at least become highly permeable to the flow of oil.

If a workover or cleanout operation is to be followed by gun or jet perforation procedures, most of the finely divided inert solids in the workover or cleanout fluid may be of a slowly oil soluble nature so they will have dissolved to a considerable degree by the time the perforating operation is carried out. Thus the disadvantages of perforating in a solid-containing fluid will be at least partly avoided. In addition, any solids which may be driven into the oil bearing formation by the force of the explosion will dissolve into the produced oil, at least in part, to restore most of the natural permeability of the formation.

In perforating operations where a batch of fluid is spotted opposite the zone to be fractured my well servicing fluid can also be used to advantage. This fluid may be solids-free. The drilling fluid in the well normally has a considerably higher density than the fluid which is spotted. Therefore, the drilling fluid tends to fall through and mix with the batch of perforation fluid to an undesirable degree. The high gel strength of my perforating fluid resists this tendency. Preferably, some slowly oil soluble solids should be included in any fluid for spotting opposite zones to be perforated. The result is a somewhat higher density and a higher gel strength. These solids are not objectionable in the perforating operation since, as previously indicated, they dissolve in the produced crude oil to restore any permeability lost due to their presence. My perforating fluid may also contain oil insoluble weighting agents such as ground limestone or barytes to increase its density so long as it also contains considerable amounts of slowly oil soluble materials. Most of the particles in finely divided weighting agents will normally pass a 325 mesh screen but are considerably too large to enter the pores of oil bearing formations. Thus they are not driven into the pores by the force of the explosion as are the finely divided clay particles in aqueous muds, but are compacted into a dense filter cake on the surface of the perforation. When this cake contains slowly oil soluble particles as well as the oil insoluble weighting agent particles, oil flowing back through the filter cake and perforation into the well dissolves the oil soluble material. The entire filter cake then usually disintegrates. Even if it does not disintegrate, it has considerable permeability due to the solution of the oil soluble portion. It is true that most of the particles of the reaction product of fatty acid residue, alkali metal hydroxide and oxidizing agent in my well servicing fluid are small enough to enter the pores of most formations. However, little permeability reduction is caused by these particles since they are small enough to be washed readily back out of the formation by the produced crude oil.

Fracturing operations should preferably be carried out in two steps. A first batch of fluid containing little, if any, propping agents should be injected to initiate the fracture. A second batch of fluid containing a suitable propping agent such as 30 to 40 mesh Ottawa sand is then injected to continue the fracturing operation by extending the fracture and propping it open. This procedure is particularly important in the formation and extension of horizontal fractures. In this case, as previously noted, the first batch should be a relatively high penetrating liquid compared to applicant's fracturing fluid, although it may be relatively low penetrating compared to crude petroleum, water, and the like. Once the horizontal fracture is initiated it can then be extended by use of my fracturing fluid, preferably having a substantially zero fluid loss, as the second batch. The extremely low loss of my fluid to fractured formations makes possible the formation of a fracture extending to a preselected distance from the well by use of a considerably smaller volume of liquid injected at a much slower rate requiring somewhat smaller pumping equipment. The quantity of propping agent per unit volume of fluid should be increased in the case of my fluid so that the total amount of propping agent in the fracture will be approximately the same as that usually deposited. The gel strength of my fluid is important in this regard to prevent excessive settling of the higher concentration of propping sand particularly at the lower flow rates permissible when my fluid is used.

The finely divided inert solids in fluids used for fracturing should preferably be oil soluble. Oil in the formation dissolves these solids to destroy the low fluid loss properties of the fluid, or more accurately the property of the filter cake, to permit unhindered flow of formation fluids into the fracture and through the fracture into the well. Thus no breaker is needed to convert the fluid to a high penetrating condition. Finely divided, oil insoluble, inorganic materials such as ground oyster shells may also be included in my fracturing fluid if desired. As previously noted, the particles of such materials are normally too large to enter the formation pores. Therefore, these particles are deposited at a thin filter cake on the faces of the fracture. Back flow of fracturing fluid and crude oil from the formation into the fracture usually displaces these filter cakes into the fracture. If the fracture is well propped by particles very large compared to the size of the filter cake particles, which is usually the case, the displaced filter cake generally disintegrates and flows through the fracture to the well with the produced oil. This is particularly true if a part of the filter cake is made up of oil soluble particles which dissolve and thus aid in the disintegration of the filter cakes.

My fracturing fluid may be mixed in one or more batches in tanks or pits on the surface before injection into the well. It is possible and usually preferred however, to mix the individual ingredients or a suitable concentrate into the oil as it is pumped down the tubing. The turbulent flow through the tubing to the bottom of the well is generally more than adequate to provide proper mixing of the ingredients.

Methods other than those described above will be apparent to those skilled in the art for use of my well servicing fluid in applications such as drilling, cleanout, perforating, fracturing, and the like, as previously mentioned, or in applying the fluid to other uses not previously mentioned, such as packer fluids for sealing the annular space between the tubing and casing above a packer in a well.

My invention will be better understood by reference to the following examples:

EXAMPLE I

To determine the effects of varying the quantity of fatty acid residue in my well completion fluid, compositions were prepared containing various amounts of Ebony fat and fixed amounts of other ingredients. The base oil was one with fairly average properties obtained from the pipe line carrying crude oil from the Slaughter field in Texas. The gravity of the crude was 32° A. P. I. Aqueous solutions of caustic soda and sodium dichromate dihydrate were prepared to supply the alkali metal hydroxide and oxidizing agent respectively. The caustic solution contained 4.4 grams of caustic soda dissolved in 7.8 ml. of water. The dichromate solution contained 11.0 grams of sodium dichromate dihydrate dissolved in 4.4 ml. of water. Sufficient caustic solution was added to provide 1.5 pounds of caustic soda per barrel of well servicing fluid. Sufficient of the dichromate solution was added to provide about 2.6 pounds of sodium dichromate dihydrate per barrel of fluid. All the compositions also contained 20 pounds per barrel of ground oyster shells and 130 pounds per barrel of finely ground barytes. The properties of the various compositions are shown in Table III.

Table III

| Ebony Fat, lb./bbl. | Stormer Visc., Cps. | Stormer Gel Strength, Grams | | A. P. I. Fluid Loss, cc./30 Min. |
|---|---|---|---|---|
| | | Initial | 10 Min. | |
| 2.5 | 95 | 3 | 7 | 2.0 |
| 5.0 | 133 | 3 | 10 | 0 |
| 7.5 | 176 | 3 | 18 | 0 |
| 10.0 | 246 | 6 | 24 | 0 |
| 20.0 | 250+ | 19 | 39 | 0 |

The tendency of the fatty acid residue to increase viscosity and gel strength and to decrease fluid loss is apparent from the data in Table III. These data also indicate why the concentration of fatty acid residue should be kept within the limits of from about 1 to about 30 pounds per barrel of drilling fluid.

EXAMPLE II

To determine the effects of varying the amount of alkali metal hydroxide in my well servicing fluid, compositions were prepared containing various quantities of caustic soda but containing fixed average amounts of other ingredients. All compositions were prepared using the same crude oil described in Example I and the same aqueous solution of caustic soda. The fluids contained 7.5 pounds per barrel of Ebony fat but no dichromate or inert solids. The latter two substances were omitted to avoid masking the effects of caustic soda on gel strength and fluid loss properties. Results of the test are presented in Table IV.

Table IV

| Caustic Soda, lb./bbl. | Stormer Visc., Cps. | Stormer Gel Strength, Grams | | A. P. I. Fluid Loss, cc./30 Min. |
|---|---|---|---|---|
| | | Initial | 10 Min. | |
| None | 16 | 0 | 0 | 57 |
| 0.5 | 85 | 18 | 50 | 37 |
| 2.5 | 86 | 13 | 33 | 32 |
| 10.0 | 92 | 12 | 31 | 17 |

These data indicate that even in the absence of dichromate and finely divided solids, considerable viscosity and gel strength are developed when caustic soda reacts with Ebony fat in oil. Some decrease in fluid loss also results. It will be apparent from the data that once a certain amount of caustic soda is present the addition of greater amounts does not greatly change the viscosity or gel strength. The changes in viscosity, gel strength and fluid loss which do occur may be due to the formation of an emulsion between the base oil and the water present in the solution of caustic soda.

EXAMPLE III

To determine the effects of oxidizing agent on my composition, fluids were prepared containing various amounts of sodium dichromate and fixed amounts of other ingredients. All compositions were prepared using the same crude oil described in Example I and the same aqueous solutions of caustic soda and dichromate. All fluids contained 7.5 pounds per barrel of Ebony fat, 1.0 pound per barrel of caustic and 20 pounds per barrel of oyster shells. The properties of the fluids are presented in Table V.

Table V

| $Na_2Cr_2O_7 \cdot 2H_2O$, lb./bbl. | Stormer Visc., cps. | Stormer Gel Strength, Grams | | A. P. I. Fluid Loss, cc./30 Min. |
|---|---|---|---|---|
| | | Initial | 10 Min. | |
| None | 76 | 3 | 10 | 6.5 |
| 1.75 | 107 | 3 | 16 | 1.5 |
| 2.6 | 67 | 1 | 8 | 0 |
| 3.5 | 59 | 1 | 4 | 0 |
| 7.0 | 70 | 1 | 4 | 0 |

The data in Table V illustrate clearly the gel strength and fluid loss reducing properties of the oxidizing agent. The data also show why the concentration of strong oxidizing agent should normally lie between about 1 and about 20 pounds per barrel.

EXAMPLE IV

To determine the effects of varying the base oil, well completion fluids were prepared using the aqueous solutions of caustic and oxidizing agent described in Example I and fixed quantities of Ebony fat and oyster shells. The properties of the resulting fluids are presented in Table VI. All fluids contain 7.5 pounds of Ebony fat per barrel, 1.0 pound of caustic per barrel, 2.6 pounds of dichromate per barrel, and 20 pounds of ground oyster shells per barrel.

Table VI

| Base Oil | | Stormer Visc., Cps. | Stormer Gel Strength, Grams | | A. P. I. Fluid Loss, cc./30 Min. |
|---|---|---|---|---|---|
| Type | A. P. I. Gravity | | Initial | 10 Min. | |
| Slaughter Field | 32 | 67 | 1 | 8 | 0 |
| Sholem Alechem Field | | 210 | 6 | 20 | 0 |
| South Houston Field | 22 | 245 | 6 | 20 | 0 |
| Sour Lake Field | 18 | 190 | 1 | 8 | 1 0 |
| No. 2 Fuel Oil | 38 | 34 | 38 | 59 | 30 |
| $C_{10}$–$C_{12}$ | 55 | 30 | 24 | 57 | 40 |
| Signal Hill | 21 | 250 | 3 | 5 | 5 |

[1] 1 pound per barrel additional caustic added.

Names of all the base oils are self-explanatory except the term $C_{10}$–$C_{12}$. This is a narrow petroleum fraction containing predominantly hydrocarbons having from 10 to 12 carbon atoms per molecule. The principal point to be noted from the data in Table VI is the wide variation of properties obtained when using the different base oils. This is particularly noticeable with regard to the gel strength and fluid loss of the compositions using refined petroleum fractions as the base oil. The reason for the high gel strength and high fluid loss, which results from use of No. 2 fuel oil and the $C_{10}$–$C_{12}$ fraction is thought to be due to the decreased solvent power of these materials for the reaction product of the Ebony fat with the caustic and dichromate, and also due to a greater tendency of these lighter hydrocarbons to solvate the colloidal particles of the reaction product. In any case, the wide variation in properties resulting from use of different oil bases shows plainly the need for means to control all the properties of the drilling fluid within wide limits.

EXAMPLE V

The effects of varying the type of fatty acid residue used were determined by preparing compositions containing fixed amounts of all ingredients by substituting other fatty acid residues for the Ebony fat used in preparing the compositions of the first four examples. The results of tests are presented in Table VII. All the compositions used the same crude oil base and the same aqueous solutions of caustic and dichromate described in Example I. All the compositions contained 7.5 pounds of the fatty acid residue, 1 pound of caustic, 2.6 pounds of dichromate, and 20 pounds of ground oyster shells. All these amounts are weights per barrel of drilling fluid.

Table VII

| Fatty Acid Residue | Stormer Visc., Cps. | Stormer Gel Strength, Grams | | A. P. I. Fluid Loss, cc./30 Min. |
|---|---|---|---|---|
| | | Initial | 10 Min. | |
| Ebony Fat | 67 | 1 | 8 | 0 |
| Tallene Pitch | 24 | 1 | 1 | 6 |
| VR-1 Acids | 45 | 1 | 8 | 4 |

The data in Table VII illustrate the operability of the two types of alternates to Ebony fat which were tested. These data also illustrate, however, the superior nature of the Ebony fat for preparing well servicing fluids according to my invention.

EXAMPLE VI

The effects of varying the type of alkali metal base were determined by preparing compositions containing fixed compositions but with different basic materials. All compositions contained 7.5 pounds of Ebony fat per barrel and were prepared using the crude oil base described in Example I. None of the compositions contained any oxidizing agent or solids in order to avoid masking the effects of the alkali metal bases. No fluid loss determinations were made since these were not considered to be significant in the absence of oxidizing agent and finely divided solids. The results of tests are presented in Table VIII.

Table VIII

| Base | Stormer Visc., Cps. | Stormer Gel Strength, Grams | |
|---|---|---|---|
| Type | lb./bbl. | | Initial | 10 Min. |
| NaOH | 0.5 | 45 | 1 | 14 |
| NH₄OH | 0.5 | 16 | 0 | 0 |
| KOH | 1.0 | 115 | 44 | 59 |

The data in Table VIII demonstrate the inability of ammonium hydroxide to develop a gel strength in the composition. Therefore, ammonium hydroxide is not considered to be an equivalent of the true alkali metal hydroxides for purposes of my invention. The potassium hydroxide on the other hand is obviously somewhat more effective in increasing viscosity and gel strengths than the caustic soda. It will be noted that the properties of the fluid reported in Table VIII using ½ pound of caustic soda per barrel, differ considerably from those reported in Table IV. This is in spite of the fact that both fluids were prepared using Ebony Fat from the same source and using Slaughter pipe line crude. The difference apparently arises due to the use in the packing plant of whatever fats are available at the time and the fact that Slaughter pipe line crude may come from various sources in the Slaughter field, depending upon the time at which the sample was taken. The tests reported in Table VIII were made several months after those reported in Table IV. Different samples of both Ebony fat and Slaughter pipe line crude were used. The variation in properties of fluids which resulted were unexpectedly great. This again illustrates the necessity of means for controlling the properties of my drilling fluid.

EXAMPLE VII

To determine the effects of substituting various oxidizing agents for sodium dichromate, drilling fluids were prepared using Sholem Alechem crude oil as a base. All fluids contained 7.5 pounds of Ebony fat, 1 pound of caustic, and 20 pounds of oyster shells per barrel of drilling fluid. The caustic soda and oxidizing agents were added as aqueous solutions, as described in Example I. 2.6 pounds of oxidizing agent were employed in every case. The results are reported in Table IX.

Table IX

| Oxidizing Agent | Stormer Visc., Cps. | Stormer Gel Strength, Grams | | A. P. I. Fluid Loss, cc./30 Min. |
|---|---|---|---|---|
| | | Initial | 10 Min. | |
| Sodium Dichromate | 210 | 6 | 20 | 0 |
| Cerium Sulfate | 164 | 4 | 10 | 0 |
| Ammonium Persulfate | 115 | 2 | 4 | 3.5 |
| Potassium Permanganate | 200 | 3 | 11 | 2.5 |

The results in Table IX indicate that all strong oxidizing agents tested were operable to produce drilling fluids having satisfactory properties. Some of the oxidizing agents, as might be expected, were somewhat superior to others. Of the four materials tested, cerium sulfate seemed to be the best in this particular crude oil. Nevertheless, sodium dichromate is generally preferred since it is almost as good and much less expensive.

EXAMPLE VIII

To determine the effects of using various finely divided solids drilling fluids were prepared containing 7.5 pounds of Ebony fat, 1 pound of caustic soda, and 2.6 pounds of sodium dichromate per barrel of drilling fluid. These additives were mixed together and then the finely divided solid was stirred into the mixture until a dry, free-flowing powdered concentrate resulted. Different solid materials required different weights to form a dry, free-flowing powder. Therefore, different quantities of the concentrate were employed for each type of solid used in order that the amounts of Ebony fat, caustic and dichromate should remain constant. The concentrates were mixed into the same crude oil described in Example I to form drilling fluids. The properties of these fluids are tabulated in Table X.

Table X

| Solid | Stormer Visc., Cps. | Stormer Gel Strength, Grams | | A. P. I. Fluid Loss, cc./30 Min. |
|---|---|---|---|---|
| Type | lbs./bbl. | | Initial | 10 Min. | |
| Oyster shells | 31.5 | 56 | 2 | 5 | 0 |
| Bentonite | 41.0 | 50 | 1 | 4 | 2.5 |
| Diatomaceous Earth | 15.0 | 42 | 1 | 4 | 30.0 |
| Xact Clay | 30.0 | 43 | 1 | 3 | 0 |
| Vinsol Resin | 10.0 | 60 | 1 | 3 | 0.5 |

The Xact clay is a low yield clay of predominantly siliceous nature not normally used in drilling fluids. Xact clay is obtainable from the Magnet Cove Barium Corporation. Vinsol resin is a wood rosin residue obtainable from the Hercules Powder Company. It has a very limited degree of solubility in kerosene and a very slow rate of solution in most crude oils. It will be apparent that all the solids tested form drilling fluids having satisfactory properties with the possible exception of diatomaceous earth. The reason for the high fluid loss of the drilling fluid containing this material may possibly be the low concentration of solids present. This is a result of the highly absorbent nature of this solid. Very little of the material was needed to dry up the liquid ingredients of the concentrate so not much of the solid was present in the drilling fluid prepared from this concentrate. Undoubtedly, a higher concentration of diatomaceous earth would product a lower filtrate rate. In addition, it is known that diatomaceous earth particles are not as strong as particles of clay, ground oyster shells and the like. Therefore, the filter cake formed by these materials might not be as effective as those formed by other finely divided particles.

EXAMPLE IX

To determine if the desirable drilling fluid properties produced by Ebony fat are due principally to the polymers present or to the monomeric acids, two drilling fluids were prepared in which one contained 7.5 pounds per barrel of Ebony fat and the other contained 7.5 pounds per barrel of oleic acid. Both drilling fluids contained 1 pound per barrel of caustic soda and 3.5 pounds per barrel of dichromate added as aqueous solutions, as described in Example I. The base oil used in both cases was a narrow boiling fraction consisting predominantly of hydrocarbons containing 10 to 12 carbon atoms per molecule. This base oil was used, and solids were omitted from the compositions, to avoid complicating factors which might arise due to unknown constituents of crude oils, and due to the fluid loss reducing properties of the solids. The properties of the drilling fluids are presented in Table XI.

Table XI

| Formula | Viscosity, Cps. | A. P. I. Fluid Loss, cc./30 Min. |
|---|---|---|
| 7.5 lb./bbl. Ebony Fat, 1.0 lb./bbl. caustic, 3.5 lb./bbl. dichromate | 18 | 38 |
| 7.5 lb./bbl. Oleic Acid, 1.0 lb./bbl. caustic, 3.5 lb./bbl. dichromate | 6 | 400+ |

A comparison of the viscosities and fluid loss rates reported in Table XI indicates clearly that the desirable drilling fluid properties produced by Ebony fat are due to the fatty acid residues rather than to the fatty acids themselves.

From the above description and examples, it will be apparent that I have accomplished the objects of my invention. An oil base drilling fluid has been provided with properties which can be controlled within wide limits. The fluid is thus applicable to a wide variety of well servicing operations. The disadvantages of the presence of a finely divided oil insoluble solid in hydraulic fracturing, perforating, and the like, can be avoided in certain embodiments of the drilling fluid by use of oil soluble finely divided solids. Certain variations of the specific materials named and described in the application will be apparent to those skilled in the art. Therefore, I do not intend to limit my well servicing fluids to these specific examples. The limits are, rather, to be found only in the claims.

I claim:

1. A liquid concentrate suitable for mixing with oil to form a well servicing fluid comprising from about 100 to 200 parts by weight of fatty acid residue containing polybasic acids having at least about 12 carbon atoms per acid radical and more oxygen than that present in the acid radical thereof, from about 0.5 to 2 parts by weight of an alkali metal base, from about 3 to 5 parts by weight of a strong oxidizing agent, sufficient water to cause said residue, base and oxidizing agent to react and sufficient oil to decrease the viscosity of the concentrate to the desired degree for convenient handling.

2. The concentrate of claim 1 in which said oil is predominantly hydrocarbon in nature, said residue is produced by the propane extraction of fatty materials selected from the group consisting of fats, oils and fatty acids, said alkali metal base is an alkali metal hydroxide and said oxidizing agent is sodium dichromate.

3. A concentrate suitable for mixing with oil to form a well servicing fluid which concentrate comprises from about 1 to 30 parts by weight of a fatty acid residue containing polybasic acids having at least about 12 carbon atoms per acid radical and more oxygen than that present in the acid radical thereof, from about 0.1 to 10 parts by weight of an alkali metal base, from about 1 to 20 parts by weight of a strong oxidizing agent and sufficient finely divided solid to form a dry, free-flowing powdery mix.

4. The concentrate of claim 3 in which the composition contains, in addition to the ingredients defined therein, sufficient water to cause reaction between said residue, base and oxidizing agent.

5. The concentrate of claim 4 in which said solid is oil soluble.

6. The concentrate of claim 4 in which said residue is produced by the propane extraction of fatty materials selected from the group consisting of fats, oils, and fatty acids, and said alkali metal base is an alkali metal hydroxide and said oxidizing agent is sodium dichromate.

7. The concentrate of claim 6 in which said solid is oil soluble.

8. An oil base well servicing fluid comprising an oil base, from about 0.5 to 70 percent by volume of water, and the following ingredients expressed on the basis of stated concentrations per barrel of said well servicing fluid: from about 1 to 30 pounds of fatty acid residue containing polybasic acids having at least about 12 carbon atoms per acid radical and more oxygen than that present in the acid radical thereof, from about 0.1 to 10 pounds of alkali metal base, from about 1 to 20 pounds of strong oxidizing agent, from 0 to about 200 pounds of inert, finely divided solid, from 0 to about 10 pounds of lecithin and from 0 to about 30 pounds of calcium chloride.

9. The well servicing fluid of claim 8 in which said inert solid is oil soluble.

10. The well servicing fluid of claim 8 in which said oil is predominantly hydrocarbon in nature, said residue is produced by the propane extraction of fatty materials selected from the group consisting of fats, oils and fatty acids, said alkali metal base is an alkali metal hydroxide, and said oxidizing agent is sodium dichromate.

11. The well servicing fluid of claim 10 in which said inert solid is oil soluble.

12. The well servicing fluid of claim 10 in which said inert solid is a solid of limited oil solubility.

13. The method of drilling a well comprising circulating in said well the well servicing fluid defined by claim 8.

14. The method of drilling a well comprising circulating in said well the well servicing fluid defined by claim 9.

15. The method of drilling a well comprising circulating in said well the well servicing fluid defined by claim 10.

16. The method of drilling a well comprising circulating in said well the well servicing fluid defined by claim 11.

17. The method of drilling a well comprising circulating in said well the well servicing fluid defined by claim 12.

References Cited in the file of this patent

UNITED STATES PATENTS

| | | |
|---|---|---|
| 2,599,752 | Fischer | June 10, 1952 |
| 2,661,334 | Lummus | Dec. 1, 1953 |
| 2,702,787 | Freeland | Feb. 22, 1955 |

UNITED STATES PATENT OFFICE

CERTIFICATE OF CORRECTION

Patent No. 2,793,996          May 28, 1957

James L. Lummus

It is hereby certified that error appears in the printed specification of the above numbered patent requiring correction and that the said Letters Patent should read as corrected below.

Column 3, line 61, for "desirabe" read -- desirable --; line 70, for "ore" read -- or --; column 10, line 4, for "adjustament" read -- adjustment --; column 11, line 4, for "insert" read -- inert --; column 12, line 14, for "Viscosity can be decreased" read -- Viscosity can be increased --; column 18, line 37, for "product" read -- produce --.

Signed and sealed this 3rd day of September 1957.

(SEAL)
Attest:

KARL H. AXLINE            ROBERT C. WATSON
Attesting Officer           Commissioner of Patents